US006918607B2

(12) United States Patent
Nakazawa et al.

(10) Patent No.: US 6,918,607 B2
(45) Date of Patent: Jul. 19, 2005

(54) SIDE STAND DEVICE

(75) Inventors: Yoshihiro Nakazawa, Saitama (JP);
Mutsuo Nakajima, Saitama (JP);
Masashi Koyanagi, Saitama (JP);
Norimasa Hattori, Saitama (JP); Koji Kano, Saitama (JP); Yoshiyuki Kurayoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/762,463

(22) Filed: Jan. 23, 2004

(65) Prior Publication Data

US 2004/0212172 A1 Oct. 28, 2004

(30) Foreign Application Priority Data

Jan. 31, 2003 (JP) ......................................... 2003-023439

(51) Int. Cl.[7] ................................................. B62H 1/02
(52) U.S. Cl. ....................................................... 280/301
(58) Field of Search ................................. 280/301, 762, 280/763.1, 288.4, 293

(56) References Cited

U.S. PATENT DOCUMENTS

2003/0111823 A1 * 6/2003 Kuboshima et al. ......... 280/301

2003/0178236 A1 * 9/2003 Su et al. ...................... 180/219

FOREIGN PATENT DOCUMENTS

| JP | 03164387 A | * | 7/1991 | ........... B62H/01/02 |
| JP | 4-25430 | | 6/1992 | |

* cited by examiner

Primary Examiner—Kevin Hurley
(74) Attorney, Agent, or Firm—Birch, Stewart, Kolasch & Birch, LLP

(57) ABSTRACT

To reduce the transmission of vibrations from a body frame to a rotary switch, thereby preventing any trouble in the rotary switch and reliably maintaining the function and performance of the rotary switch. A side stand device includes a side stand bracket mounted on the body frame. A side stand is rotatably mounted through a pivot shaft to the bracket, and a rotary switch is provided in coaxial relationship with the pivot bolt through a securing bolt. A sheet is interposed between the rotary switch and the pivot bolt, and a tube and a sheet are interposed between the rotary switch and the securing bolt. The sheets and the tube are formed from rubber members. A cushion member is interposed between an engaging member of an inner rotor in the rotary switch and a locking hole of the side stand. The cushion member is formed from a rubber member.

20 Claims, 4 Drawing Sheets

SIDE STAND DEVICE

CROSS-REFERENCE TO RELATED APPLICATIONS

The present non-provisional application claims priority under 35 USC 119 to Japanese Patent Application No. 2003-023439 filed on Jan. 31, 2003 the entire contents thereof is hereby incorporated by reference.

BACKGROUND OF THE INVENTION

1. Field of the Invention

The present invention relates to a side stand device mounted on a body frame of a two-wheeled vehicle such as a motorcycle for supporting the vehicle in its standing condition during parking.

2. Description of Background Art

A conventional side stand device includes a side stand bracket mounted on a body frame of a motorcycle, a pivot shaft extending laterally with respect to the body frame, and a side stand mounted on the side stand bracket so as to be pivotable about the axis of the pivot shaft. The side stand device further includes a rotary switch fixed to the side stand bracket in substantially coaxial relationship with the pivot shaft, a rotating shaft connected to a movable contact of the rotary switch for rotationally operating the movable contact, and a pivotable member adapted to be pivotably moved together with the side stand. The rotating shaft and the pivotable member are connected together through play absorbing means capable of absorbing slight fluctuations. When the side stand is retracted to a normal inoperative position, the movable contact comes into contact with a fixed contact of the rotary switch to indicate the retracted condition of the side stand on an indicator. See, for example, Japanese Utility Model Publication No. Hei 4-25430, pages 2 to 3, FIGS. 2 to 5.

In this conventional side stand device for a motorcycle, the play absorbing means functions to absorb shock or play generated in the side stand and thereby to suppress the transmission of such shock or play to the rotary switch. However, the rotary switch is not provided with any means for absorbing vibrations generated in the body frame. Thus, when this device is applied to an engine producing large vibrations, measures for absorbing the vibrations are required. Accordingly, in the case where the engine vibrations are large, an engine output must be reduced or the engine mount to the body frame must be made through a rubber mount having a complicated configuration. Thus, the measures for absorbing the vibrations are accompanied by an output restriction or an increase in the manufacturing cost for the motorcycle.

SUMMARY AND OBJECTS OF THE INVENTION

It is accordingly an object of the present invention to provide a side stand device which can minimize the transmission of vibrations from the body frame of a two-wheeled vehicle to the rotary switch, thereby preventing any trouble in the rotary switch and reliably maintaining the function and performance of the rotary switch.

The present invention provides a side stand device having a bracket mounted on a body frame of a two-wheeled vehicle, a pivot shaft extending laterally with respect to the body frame, and a side stand mounted on the bracket so as to be rotatable about the axis of the pivot shaft. The side stand device includes a rotary switch provided in coaxial relationship with the pivot shaft, and a vibration absorbing member is interposed between the pivot shaft and the rotary switch.

With this configuration, vibrations generated in the body frame of the two-wheeled vehicle during operation are absorbed by the vibration absorbing member, so that the transmission of the vibrations from the body frame through the pivot shaft to the rotary switch can be effectively reduced. Accordingly, any trouble in the rotary switch can be prevented to thereby reliably maintain the function and performance of the rotary switch.

In accordance with the present invention, the rotary switch and the vibration absorbing member are fixed to the pivot shaft by a common bolt.

Accordingly, the rotary switch and the vibration absorbing member can be simultaneously mounted to the side stand by tightening the single bolt.

In accordance with the present invention, the rotary switch is rotatably supported to the bolt axially inserted through the rotary switch in coaxial relationship with the pivot shaft and is fixed to an axial end of the pivot shaft by the bolt. The vibration absorbing member includes a first member interposed between the axial end of the pivot shaft and the rotary switch, and a second member is interposed between the bolt and the rotary switch.

Accordingly, the transmission of vibrations from the bolt fixing the rotary switch to the pivot shaft to the rotary switch can also be suppressed to thereby more reliably maintain the function and performance of the rotary switch.

In accordance with the present invention, the side stand device further includes a positioning member fixed to the bracket for restricting rotation of a housing of the rotary switch about the axis of the pivot shaft, and another vibration absorbing member is interposed between the positioning member and the housing.

Accordingly, the transmission of vibrations from the body frame through the positioning member to the rotary switch can be suppressed by the vibration absorbing member, thereby more reliably maintaining the function and performance of the rotary switch.

In accordance with the present invention, the side stand device further includes another vibration absorbing member interposed between an engaging portion of an inner rotor in the rotary switch and a locking portion of the side stand, wherein the engaging portion is engaged with the locking portion to rotate the inner rotor in association with rotation of the side stand about the axis of the pivot shaft. Accordingly, the transmission of vibrations from the side stand through the engagement of the locking portion and the engaging portion to the inner rotor can be effectively suppressed by the vibration absorbing member, thereby obtaining a reliable operation of the inner rotor.

In accordance with the present invention, each of the vibration absorbing member includes a rubber member.

Accordingly, each vibration absorbing member can be improved in reliability, thereby maintaining the reliability of operation of the rotary switch stably for a long period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
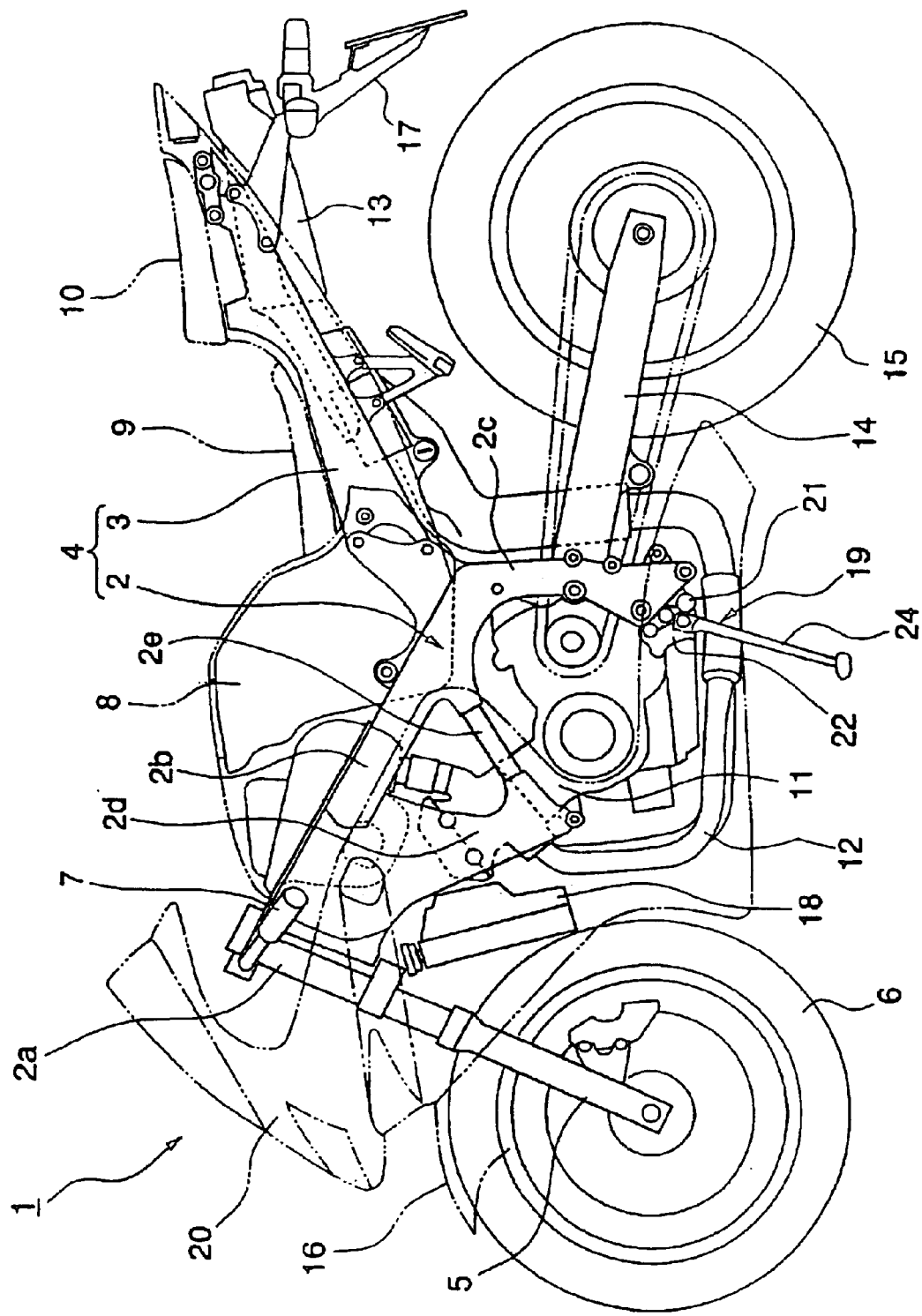
FIG. 1 is a side view of a motorcycle including a side stand device according to a preferred embodiment of the present invention.

There will now be described a side stand device according to a preferred embodiment of the present invention with reference to the drawings. In the following description, the terms of "front," "rear," "right," and "left" specify positions or directions that are defined with respect to a operator positioned on a motorcycle 1 including the side stand device according to the preferred embodiment of the present invention.

The general configuration of the motorcycle 1 will first be described with reference to FIG. 1. The motorcycle (two-wheeled vehicle) 1 mainly includes a vehicle body 4 composed of a cradle type body frame 2 and a seat rail 3 extending rearwardly from the body frame 2. A front fork 5 is mounted to a head pipe 2a of the body frame 2 with a front wheel 6 mounted to the front fork 5 and a steering handle 7 connected to the front fork 5. A fuel tank 8 is mounted on an upper portion of the body frame 2. A front seat 9 and a rear seat 10 are both mounted on the seat rail 3. A four-cycle engine 11 is located inside a cradle space defined by the body frame 2 with a muffler 13 connected through an exhaust pipe 12 to an exhaust manifold of the engine 11. A swing arm 14 is suspended through a rear cushion (not shown) to a rear portion of the body frame 2 with a rear wheel 15 mounted to the swing arm 14. A front fender 16 is provided for covering the front wheel 6 and a rear fender 17 is provided for covering the rear wheel 15. A radiator 18 is mounted in front of the engine 11. A side stand device 19 according to the preferred embodiment of the present invention is secured to the body frame 2. This motorcycle 1 is a full cowling type vehicle wherein the vehicle body 4 is covered with a cowl 20.

The body frame 2 is composed of right and left main frames 2b, only the left main frame 2b being shown in FIG. 1, extending rearwardly from the head pipe 2a, right and left center frames 2c extending downwardly from the rear ends of the main frames 2b, right and left down frames 2d extending rearwardly and obliquely downwardly from the head pipe 2a and front portions of the main frames 2b, right and left engine hangers 2e extending between the rear ends of the down frames 2d and the rear ends of the main frames 2b, and a plurality of cross members (not shown). The side stand device 19 is mounted on a lower end portion of the left center frame 2c. Some or all of the above components of the body frame 2 may be formed by casting.

Figure 2:
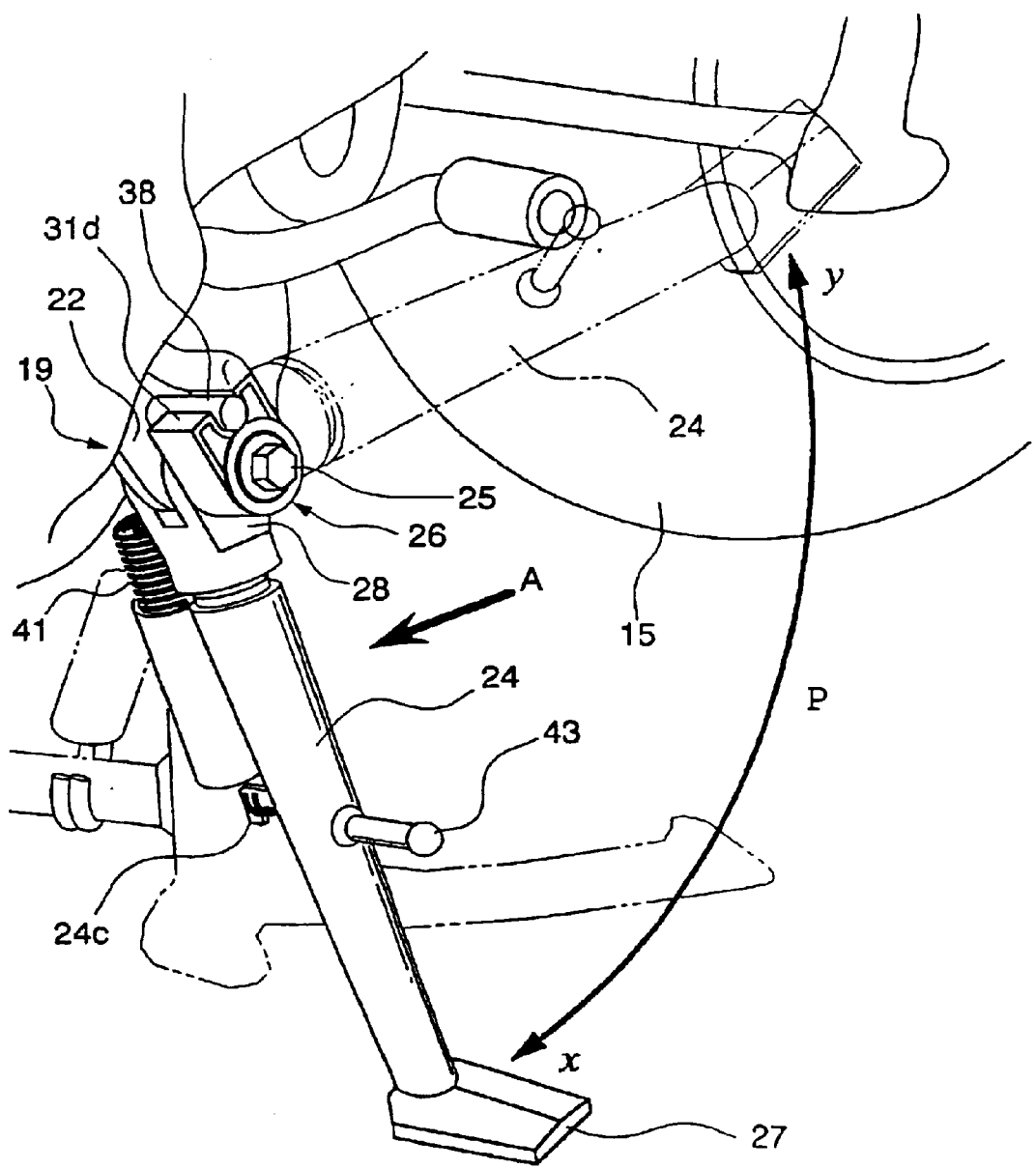
FIG. 2 is a perspective view of the side stand device according to the preferred embodiment.
Figure 3:
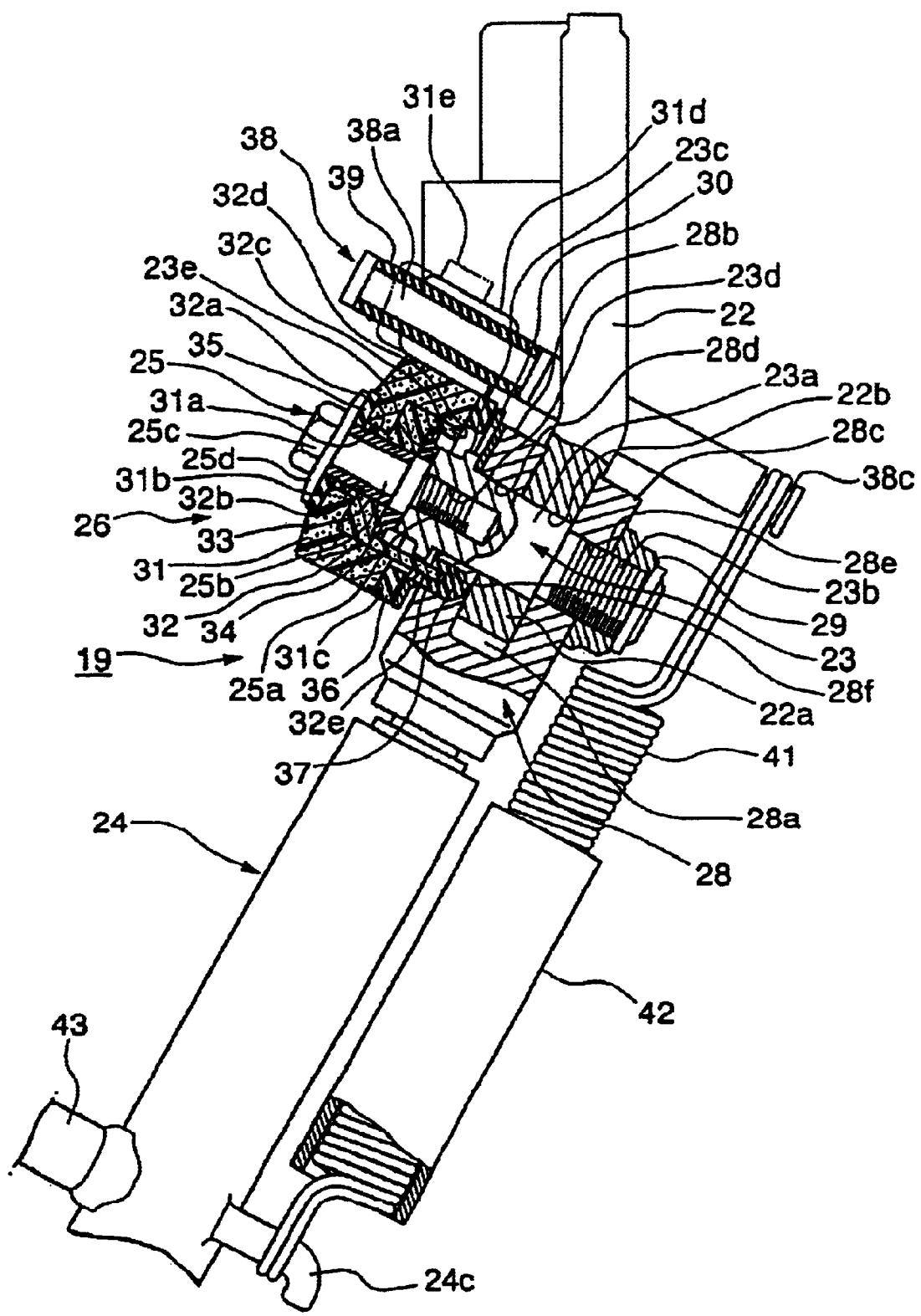
FIG. 3 is a partially sectional view taken in the direction shown by an arrow A in FIG. 2.
Figure 4:
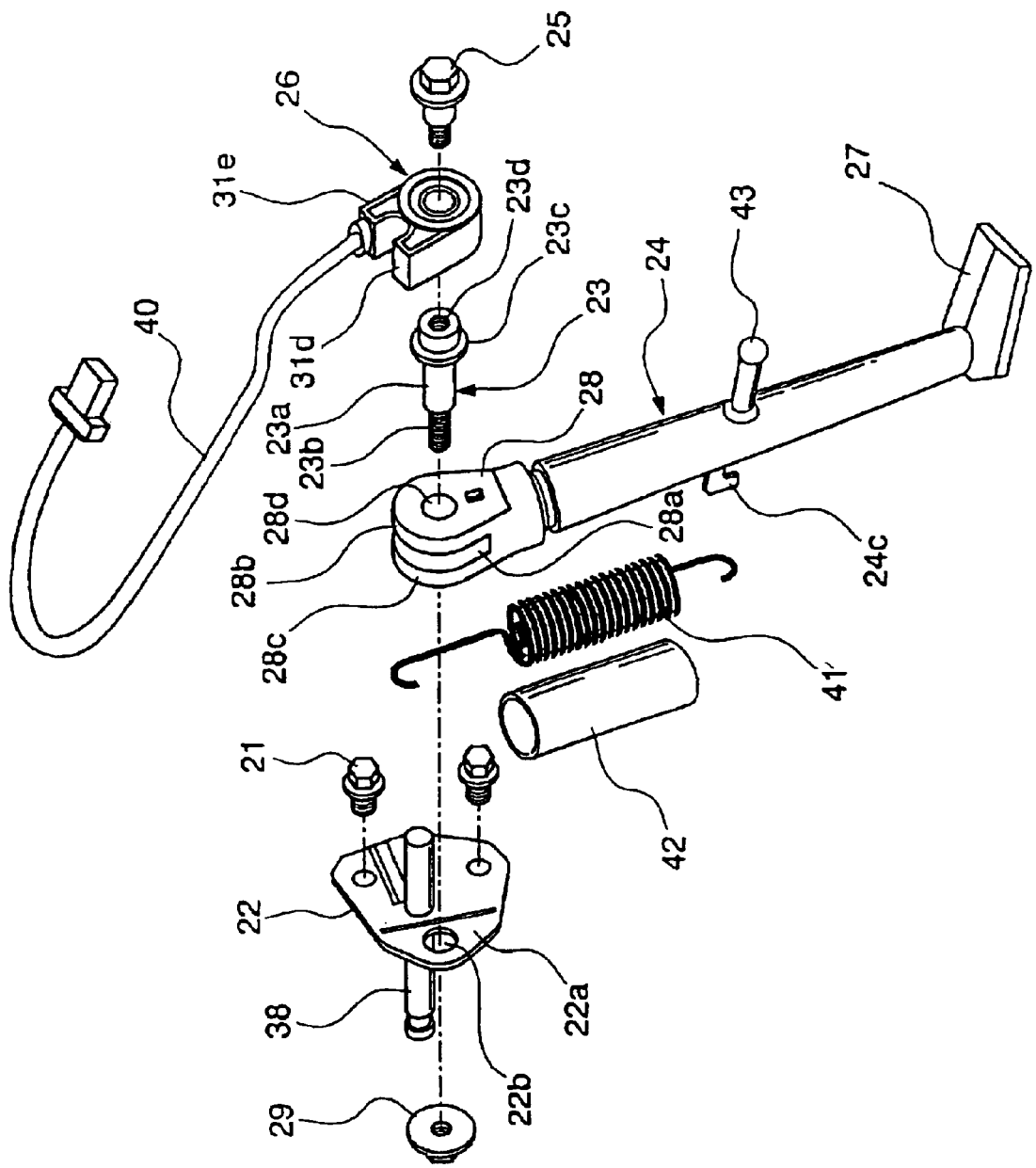
FIG. 4 is an exploded perspective view of the side stand device according to the preferred embodiment.

The side stand device 19 according to the preferred embodiment of the present invention will now be described in detail with reference to FIGS. 2 to 4.

The side stand device 19 includes a platelike side stand bracket (bracket) 22 mounted on the lower end portion of the left center frame 2c of the body frame 2 by means of a pair of bolts 21. A pivot bolt (pivot shaft) 23 is supported on the bracket 22 so as to extend in the lateral direction with respect to the body frame 2. A side stand 24 is pivotably mounted through the pivot bolt 23 to the bracket 22 with a rotary switch 26 as a side stand switch mounted on the pivot bolt 23 by means of a securing nut 25 in coaxial relationship with the pivot bolt 23.

The bracket 22 has a lower end portion as a side stand mounting portion 22a bent outwardly to the left side with respect to the body frame 2 so as to be inclined with respect thereto. The mounting portion 22a is formed with a shaft hole 22b extending perpendicularly to the opposite surfaces of the mounting portion 22a. The side stand 24 is a rodlike member having at its front end a side stand arm 27 adapted to come into contact with the ground and at its base end a bifurcated member 28 formed with an insert groove 28a. The insert groove 28a of the bifurcated member 28 is fitted with the mounting portion 22a of the bracket 22. The bifurcated member 28 has a pair of support portions 28b and 28c between which the insert groove 28a is formed. The support portions 28b and 28c are respectively formed with shaft holes 28d and 28e extending perpendicularly to the opposite surfaces of the respective support portions 28b and 28c. The pivot bolt 23 is inserted through the shaft holes 28d and 28e of the bifurcated member 28 and the shaft hole 22b of the bracket 22. Thus, the side stand 24 is mounted through the pivot bolt 23 to the bracket 22 so as to be pivotable about the axis of the pivot bolt 23.

More specifically, the pivot bolt 23 has an intermediate stem portion 23a closely inserted in the shaft hole 28d of the outer support portion 28b of the bifurcated member 28 and the shaft hole 22b of the bracket 22 from the outer side (left side) of the body frame 2. The pivot bolt 23 further has a threaded portion 23b at its front end portion (inner end portion, or right end portion) inserted through the shaft hole 28e of the inner support portion 28c of the bifurcated member 28. The threaded portion 23b is smaller in diameter than the stem portion 23a, and a shoulder portion formed between the stem portion 23a and the threaded portion 23b is in abutment against the inner wall surface of the inner support portion 28c exposed to the insert groove 28a. The threaded portion 23b partially projects from the shaft hole 28e of the inner support portion 28c, and a nut 29 is threadedly engaged with this projecting portion of the threaded portion 23b. By tightening the nut 29, the pivot bolt 23 can be fixed to the bifurcated member 28 of the side stand 24. Accordingly, the side stand 24 is adapted to rotate with the pivot bolt 23 relative to the bracket 22. The pivot bolt 23 is further formed with a flange 23c near the outer end (left end), and a spacer 30 is interposed between the flange 23c and the outer side surface (left side surface) of the outer support portion 28b of the bifurcated member 28.

The rotary switch 26 includes a cylindrical housing 31 formed of an insulating material such as synthetic resin. The cylindrical housing 31 has an outer closed end formed with a shaft hole 31a. The rotary switch 26 further includes an inner rotor 32 formed of an insulating material such as synthetic resin. The inner rotor 32 is generally cylindrical such that it has an outer closed end formed with an outside projecting small-diameter cylindrical portion 32a. The small-diameter cylindrical portion 32a is fitted with the shaft hole 31a of the housing 31. The inner rotor 32 is accommodated in the housing 31 so as to be rotatable relative to the housing 31 in coaxial relationship therewith. The rotary switch 26 further includes a fixed contact (not shown) fixed to the housing 31 and a movable contact (not shown) fixed to the inner rotor 32.

The securing bolt 25 is inserted into the inner rotor 32 through a shaft hole 32b of the small-diameter cylindrical portion 32a of the inner rotor 32 so as to be positioned in alignment with the pivot bolt 23. The securing bolt 25 is formed with an externally threaded portion 25a at its front end portion (inner end portion), and the pivot bolt 23 is formed with a tapped hole 23d at its head portion (outer end portion). The externally threaded portion 25a of the securing bolt 25 is engaged with the tapped hole 23d of the pivot bolt 23. Thus, the rotary switch 26 is mounted to the pivot bolt 23 so as to be rotatable relative thereto in coaxial relationship therewith.

A tube 33 is interposed between the outer circumference of a stem portion 25b of the securing bolt 25 and the shaft hole 32b of the small-diameter cylindrical portion 32a of the inner rotor 32. The tube 33 is formed from a rubber member (vibration absorbing member) preliminarily mounted on the stem portion 25b. Further, an annular sheet 34 is interposed between an outer end surface 23e of the pivot bolt 23 and an inner end surface 32c of the inner rotor 32. The annular sheet 34 is also formed from a rubber member. Further, an annular sheet 35 is interposed between an outer end surface 31b of the housing 31 and a head portion 25c of the securing bolt 25 in such a manner so as to be covered with a washer 25d preliminarily fitted with the stem portion 25b and abutting against the head portion 25c. The annular sheet 35 is also formed from a rubber member preliminarily fixed to the housing 31.

The housing 31 and the inner rotor 32, respectively, have inner end surfaces 31c and 32d substantially flush with each other. An annular sheet 36 is interposed between the inner end surface 31c of the housing 31 and the spacer 30 (or the bifurcated member 28 of the side stand 24 in the case that the spacer 30 is omitted) in such a manner that a fine gap is defined between the annular sheet 36 and the spacer 30 (or the outer support portion 28b of the bifurcated member 28). The annular sheet 36 is formed from a rubber member preliminarily fixed to the inner end surface 31c of the housing 31. The inner rotor 32 is formed with an engaging member (engaging portion) 32e projecting from the inner end surface 32d toward the bifurcated member 28. The engaging member 32e is formed at a given circumferential position on the inner rotor 32. On the other hand, a locking hole (locking portion) 28f is formed at a given position on the outer support portion 28b of the bifurcated member 28. The engaging member 32e is engaged with the locking hole 28f. More specifically, a cushion member 37 is interposed between the bifurcated member 28 and the engaging member 32e. The cushion member 37 is formed from a rubber member preliminarily mounted in the locking hole 28f.

A positioning pin (positioning member) 38 extends parallel to the pivot bolt 23 and is fixed to the bracket 22 so as to extend therethrough. The housing 31 of the rotary switch 26 is formed with a positioning portion 31d and a wiring leading portion 31e circumferentially spaced a given distance from the positioning portion 31d. The positioning portion 31d and the wiring leading portion 31e project in substantially the radial direction of the housing 31. An outer shaft portion 38a of the positioning pin 38 is held between the positioning portion 31d and the wiring leading portion 31e, so that rotation of the housing 31 about the axis of the pivot bolt 23 is restricted to thereby circumferentially position the housing 31.

Accordingly, when the side stand 24 is rotated about the axis of the pivot bolt 23 in a vertical direction (upward or downward direction shown by an arrow P in FIG. 2), the inner rotor 32 is rotated relative to the housing 31 in association with the rotation of the side stand 24 through the engagement of the locking hole 28f of the bifurcated member 28 and the engaging member 32e of the inner rotor 32. When the side stand 24 is rotated in the downward direction to reach a standing position x where the side stand arm 27 comes into contact with the ground (see FIG. 2), the movable contact fixed to the inner rotor 32 is separated from the fixed contact fixed to the housing 31, whereas when the side stand 24 is rotated in the upward direction to reach a retracted position y where the side stand 24 is retracted so as to extend substantially horizontally (see FIG. 2), the movable contact of the inner rotor 32 comes into contact with the fixed contact of the housing 31, so that a circuit in a required indicator (not shown) is closed through wiring 40 extending from the wiring leading portion 31e, thereby indicating the retracted condition of the side stand 24 on the indicator.

Further, a tube 39 is interposed between the positioning pin 38 and the positioning portion 31d and between the positioning pin 38 and the wiring leading portion 31e. The tube 39 is formed from a rubber member preliminarily mounted on the outer circumference of the outer shaft portion 38a of the positioning pin 38. The positioning pin 38 is formed at its inner end portion with a spring support portion 38c, and the side stand 24 is formed with a hook portion 24c. An extension spring 41 is connected between the spring support portion 38c of the positioning pin 38 and the hook portion 24c of the side stand 24, so as to retain the standing position x or the retracted position y of the side stand 24. A tube 42 is formed of a flexible material and mounted on the outer circumference of the extension spring 41. A foot operated portion 43 is provided for allowing the vertical rotation of the side stand 24 between the standing position x and the retracted position y by the operator's foot.

In the case of parking the motorcycle 1, the side stand 24 is rotated downwardly by utilizing the foot operated portion 43 to make the side stand arm 27 come into contact with the ground. At this time, the inner rotor 32 of the rotary switch 26 is rotated about the axis of the securing bolt 25 (the pivot bolt 23) through the engagement of the engaging member 32e and the locking hole 28f of the bifurcated member 28. As a result, the movable contact fixed to the inner rotor 32 is separated from the fixed contact fixed to the housing 31, and the standing position x of the side stand 24 can be visually recognized. In the case of operation the motorcycle 1, the side stand 24 is rotated upwardly to the substantially horizontal position by utilizing the foot operated portion 43, the inner rotor 32 is rotated about the axis of the securing bolt 25 in a direction opposite to the above. As a result, the movable contact of the inner rotor 32 comes into contact with the fixed contact of the housing 31 to close the circuit in the indicator, thereby indicating the retracted position y of the side stand 24 on the indicator. Thus, the motorcycle 1 can be driven safely.

According to the side stand device 19, the side stand 24 is mounted through the pivot bolt 23 extending laterally with respect to the body frame 2 of the motorcycle 1 to the side stand bracket 22 mounted on the body frame 2 so as to be rotatable about the axis of the pivot bolt 23. Further, the rotary switch 26 is coaxially supported to the pivot bolt 23 of the side stand 24 by the securing bolt 25 axially inserted through the rotary switch 26. Further, the sheet 34 formed from a rubber member is interposed between the pivot bolt 23 and the rotary switch 26, and the tube 33 and the sheet 35, each formed from a rubber member, are interposed between the securing bolt 25 and the rotary switch 26. With this configuration, the transmission of vibrations generated in the body frame 2 of the motorcycle 1 from the pivot bolt 23 directly to the rotary switch 26 or through the securing bolt 25 to the rotary switch 26 can be effectively reduced by the rubber members forming the sheets 34 and 35 and the tube 33. Accordingly, any trouble or chattering in the rotary switch 26 due to the above vibrations can be prevented to thereby reliably maintain the function and performance of the rotary switch 26.

Furthermore, the rotary switch 26, the sheets 34 and 35, and the tube 33 can be simultaneously mounted to the pivot bolt 23 of the side stand 24 by tightening the single securing bolt 25. Accordingly, the mounting work for the rotary switch 36 and its related members to the pivot bolt 23 can be performed easily and quickly.

The positioning pin 38 for restricting rotation of the housing 31 of the rotary switch 26 about the axis of the pivot bolt 23 is fixed to the side stand bracket 22. Further, the housing 31 is positioned so that the positioning pin 38 is held between the positioning portion 31d and the wiring leading portion 31e of the housing 31, and the tube 39 formed from a rubber member is mounted on the positioning pin 38 so that the tube 39 is present between the positioning portion 31d and the positioning pin 38 and between the wiring leading portion 31e and the positioning pin 38. Accordingly, the transmission of vibrations from the body frame 2 (the bracket 22) through the positioning pin 38 to the rotary switch 26 can be suppressed. Thus, a more reliable maintenance of the function and performance of the rotary switch 26 can be obtained.

The cushion member 37 is interposed between the engaging member 32e of the inner rotor 32 of the rotary switch 26 and the locking hole 28f of the bifurcated member 28 of the side stand 24, wherein the engaging member 32e is engaged with the locking hole 28f to rotate the inner rotor 32 in association with rotation of the side stand 24 about the axis of the pivot bolt 23. Accordingly, the transmission of vibrations from the side stand 24 through the engagement of the locking hole 28f and the engaging member 32e to the inner rotor 32 can be effectively suppressed by the cushion member 37, thereby obtaining a reliable operation of the inner rotor 32.

Further, the sheet 36 is interposed between the end surface 31c of the housing 31 of the rotary switch 26 and the spacer 30 or the outer end surface of the bifurcated member 28 of the side stand 24 in such a manner that a fine gap is defined between the sheet 36 and the spacer 30 or the outer end surface of the outer support portion 28b of the bifurcated member 28. The sheet 36 is formed from a rubber member fixed to the end surface 31c of the housing 31. Accordingly, even when the vibration phase between the housing 31 and the bifurcated member 28 of the side stand 24 becomes a buffer condition, the application of any undue force from the side stand 24 to the rotary switch 26 can be effectively prevented by the sheet 36.

Further, since the tubes 33 and 39, the sheets 34 and 35, and the cushion member 37 are all formed from rubber members, each vibration absorbing member for absorbing vibrations transmitted from the bracket 22 to the rotary switch 26 can be improved in reliability, thereby maintaining the reliability of operation of the rotary switch 26 stably for a long period of time.

While the rotary switch 26 is rotatably supported on the stem portion 25b of the securing bolt 25 and mounted to the outer axial end of the pivot bolt 23 in this preferred embodiment, this mounting structure may be modified in the following manner. The outer axial end of the pivot bolt 23 extends to form a stem portion corresponding to the stem portion 25b of the securing bolt 25, and the rotary switch 26 is rotatably supported to this extended stem portion of the pivot bolt 23. Furthermore, the outer axial end of the extended stem portion is tapped to form a screw hole, and a small bolt is threadedly engaged into this screw hole with a washer. Also in this case, the tube 33 is interposed between the extended stem portion and the inner rotor 32 of the rotary switch 26, and the sheet 35 is interposed between the washer and the housing 31. Further, while the rotary switch 26 is provided outside of the side stand 24 (on the left side of the side stand 24) in this preferred embodiment, the rotary switch 26 may be provided inside of the side stand 24 (on the right side of the side stand 24) by inverting the inner and outer ends of the pivot bolt 23.

According to the present invention, the following excellent effects can be exhibited. The rotary switch is provided in a coaxial relationship with the pivot shaft of the side stand, and the vibration absorbing member is interposed between the pivot shaft and the rotary switch. With this configuration, the transmission of vibrations generated in the body frame of the two-wheeled vehicle from the pivot shaft to the rotary switch can be effectively reduced by the vibration absorbing member. Accordingly, any trouble or chattering in the rotary switch can be prevented to thereby reliably maintain the function and performance of the rotary switch.

The rotary switch and the vibration absorbing member are fixed to the pivot shaft by the common bolt. Accordingly, the rotary switch and the vibration absorbing member can be simultaneously mounted to the side stand by tightening the single bolt, so that the mounting work for the rotary switch and the vibration absorbing member to the side stand can be performed easily and quickly.

The rotary switch is fixed to the axial end of the pivot shaft by the bolt inserted through the rotary switch in a coaxial relationship with the pivot shaft, and the vibration absorbing member is interposed between the axial end of the pivot shaft and the rotary switch and between the bolt and the rotary switch. Accordingly, the transmission of vibrations from the bolt fixing the rotary switch to the pivot shaft to the rotary switch can also be well suppressed to thereby more reliably maintain the function and performance of the rotary switch.

The positioning member for restricting rotation of the housing of the rotary switch about the axis of the pivot shaft is fixed to the bracket, and the vibration absorbing member is interposed between the positioning member and the housing. Accordingly, the transmission of vibrations from the body frame through the positioning member to the rotary switch can be well suppressed by the vibration absorbing member to thereby more reliably maintain the function and performance of the rotary switch.

The vibration absorbing member is interposed between the engaging portion of the inner rotor of the rotary switch and the locking portion of the side stand, wherein the engaging portion is engaged with the locking portion to rotate the inner rotor in association with rotation of the side stand about the axis of the pivot shaft. Accordingly, the transmission of vibrations from the side stand through the engagement of the locking portion and the engaging portion to the inner rotor can be effectively suppressed by the vibration absorbing member, thereby obtaining a reliable operation of the inner rotor.

Each vibration absorbing member is formed from a rubber member. Accordingly, each vibration absorbing member can be improved in reliability, thereby maintaining the reliability of operation of the rotary switch stably for a long period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A side stand device having a bracket mounted on a body frame of a two-wheeled vehicle, a pivot shaft extending laterally with respect to said body frame, and a side stand mounted on said bracket so as to be rotatable about the axis of said pivot shaft, said side stand device comprising:
   a rotary switch provided in coaxial relationship with said pivot shaft; and
   a vibration absorbing member interposed between said pivot shaft and said rotary switch.

2. The side stand device according to claim 1, wherein said rotary switch and said vibration absorbing member are fixed to said pivot shaft by a common bolt.

3. The side stand device according to claim 2, wherein:
   said rotary switch is rotatably supported to said bolt axially inserted through said rotary switch in coaxial relationship with said pivot shaft, and is fixed to an axial end of said pivot shaft by said bolt; and
   said vibration absorbing member comprises a first member interposed between said axial end of said pivot shaft and said rotary switch, and a second member interposed between said bolt and said rotary switch.

4. The side stand device according to claim 1, and further including a positioning member fixed to said bracket for restricting rotation of a housing of said rotary switch about the axis of said pivot shaft, and another vibration absorbing member interposed between said positioning member and said housing.

5. The side stand device according to claim 2, and further including a positioning member fixed to said bracket for restricting rotation of a housing of said rotary switch about the axis of said pivot shaft, and another vibration absorbing member interposed between said positioning member and said housing.

6. The side stand device according to claim 3, and further including a positioning member fixed to said bracket for restricting rotation of a housing of said rotary switch about the axis of said pivot shaft, and another vibration absorbing member interposed between said positioning member and said housing.

7. The side stand device according to claim 1, and further including another vibration absorbing member interposed between an engaging portion of an inner rotor in said rotary switch and a locking portion of said side stand, wherein said engaging portion is engaged with said locking portion to rotate said inner rotor in association with rotation of said side stand about the axis of said pivot shaft.

8. The side stand device according to claim 2, and further including another vibration absorbing member interposed between an engaging portion of an inner rotor in said rotary switch and a locking portion of said side stand, wherein said engaging portion is engaged with said locking portion to rotate said inner rotor in association with rotation of said side stand about the axis of said pivot shaft.

9. The side stand device according to claim 3, and further including another vibration absorbing member interposed between an engaging portion of an inner rotor in said rotary switch and a locking portion of said side stand, wherein said engaging portion is engaged with said locking portion to rotate said inner rotor in association with rotation of said side stand about the axis of said pivot shaft.

10. The side stand device according to claim 4, and further including another vibration absorbing member interposed between an engaging portion of an inner rotor in said rotary switch and a locking portion of said side stand, wherein said engaging portion is engaged with said locking portion to rotate said inner rotor in association with rotation of said side stand about the axis of said pivot shaft.

11. The side stand device according to claim 1, wherein each of said vibration absorbing member comprises a rubber member.

12. The side stand device according to claim 2, wherein each of said vibration absorbing member comprises a rubber member.

13. The side stand device according to claim 3, wherein each of said vibration absorbing member comprises a rubber member.

14. The side stand device according to claim 4, wherein each of said vibration absorbing member comprises a rubber member.

15. The side stand device according to claim 5, wherein each of said vibration absorbing member comprises a rubber member.

16. A side stand device adapted for use with a body frame of a two-wheeled vehicle comprising:
   a bracket;
   a pivot shaft extending substantially laterally with respect to the bracket;
   a side stand rotatably mounted on said bracket about the axis of said pivot shaft;
   a rotary switch provided in coaxial relationship with said pivot shaft; and
   a vibration absorbing member interposed between said pivot shaft and said rotary switch.

17. The side stand device according to claim 16, wherein said rotary switch and said vibration absorbing member are fixed to said pivot shaft by a common bolt.

18. The side stand device according to claim 17, wherein:
   said rotary switch is rotatably supported to said bolt axially inserted through said rotary switch in coaxial relationship with said pivot shaft, and is fixed to an axial end of said pivot shaft by said bolt; and
   said vibration absorbing member comprises a first member interposed between said axial end of said pivot shaft and said rotary switch, and a second member interposed between said bolt and said rotary switch.

19. The side stand device according to claim 16, and further including a positioning member fixed to said bracket for restricting rotation of a housing of said rotary switch about the axis of said pivot shaft, and another vibration absorbing member interposed between said positioning member and said housing.

20. The side stand device according to claim 16, and further including another vibration absorbing member interposed between an engaging portion of an inner rotor in said rotary switch and a locking portion of said side stand, wherein said engaging portion is engaged with said locking portion to rotate said inner rotor in association with rotation of said side stand about the axis of said pivot shaft.

* * * * *